AUTOMATIC SAMPLE HANDLING APPARATUS

Original Filed July 2, 1962 2 Sheets-Sheet 1

INVENTORS
HANS BARUCH
ERIK W. ANTHON
BY Schapp & Hatch
ATTORNEYS

AUTOMATIC SAMPLE HANDLING APPARATUS

Original Filed July 2, 1962 2 Sheets-Sheet 2

INVENTORS
HANS BARUCH
ERIK W. ANTHON
BY Schapp & Hatch
ATTORNEYS

United States Patent Office

Re. 26,055
Reissued July 5, 1966

26,055

AUTOMATIC SAMPLE HANDLING APPARATUS

Hans Baruch, Berkeley, and Erik W. Anthon, Kensington, Calif., assignors, by mesne assignments, to Warner-Lambert Pharmaceutical Company, Morris Plains, N.J.

Original No. 3,192,969, dated July 6, 1965, Ser. No. 207,111, July 2, 1962. Application for reissue July 12, 1965, Ser. No. 471,798
13 Claims. (Cl. 141—90)

Figure 1:
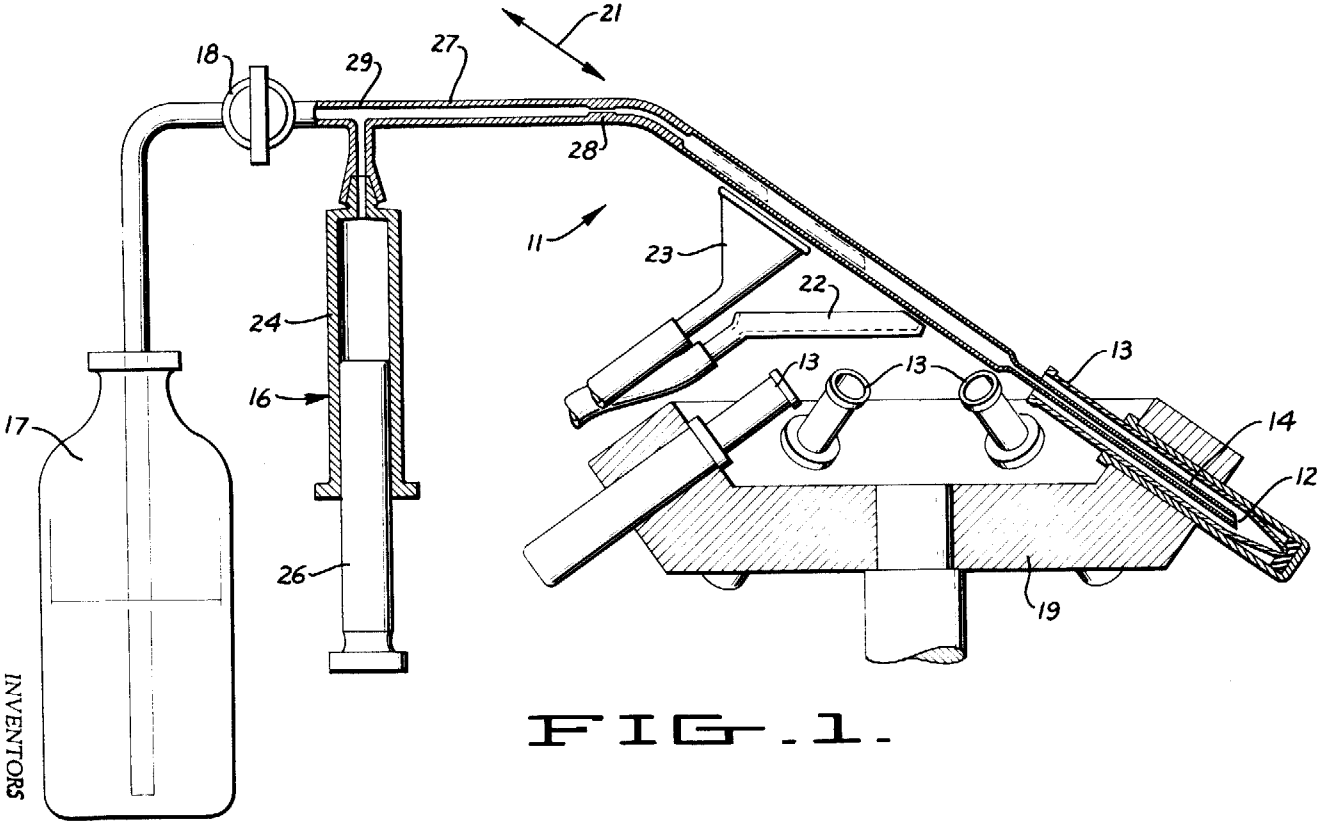

Matter enclosed in heavy brackets [ ] appears in the original patent but forms no part of this reissue specification; matter printed in italics indicates the additions made by reissue.

The present invention relates to improvements in an automatic sample handling apparatus, and more particularly to an apparatus for transferring a measured quantity of sample or like liquid from one position to another.

In certain types of analytical procedures, large numbers of routine determinations must be carried out. Particularly applicable are those employed in biochemical, physiological and medical laboratories where materials such as blood, blood serum, tissue serum, urine or other materials are tested and/or analyzed. These tests are particularly suited for automation because the analytical procedures are repeated a large number of times. However, certain of the procedural steps required have been somewhat difficult to automate in comparatively simple and reliable equipment capable of providing the necessary continued accuracy.

One of the problems encountered in automating such analytical procedures is that of accurately measuring and handling liquid samples where a large number of samples are desired to be handled by the same piece of equipment. One of the difficulties encountered is the required washing of the piece of equipment used so as to prevent contamination by previously handled samples. One way of handling this problem is to provide means for washing the unit between samples, but this generally requires additional equipment. Thus the present invention provides a simpler and more economic solution to this problem, where the washing requirement is reduced or eliminated.

In most analytical procedures, it is necessary to add a certain quantity of diluent or reagent to the sample as it is processed. In the present invention, this diluent or reagent can be used not only to provide the necessary step of addition thereof, but also used to clean out the mechanism for measuring and delivering a fixed quantity of sample.

Accordingly, it is the primary object of the present invention to provide an apparatus for transferring a measured quantity of sample from one position to another which is completely automatic in its operation.

Another object of this invention is to provide an apparatus of the character described in which an exceedingly accurate measure of sample can be taken up and dispensed.

A further object of the invention is to provide an apparatus of the character described which is self-cleaning and substantially eliminates any contamination from previously handled sample material.

Still another object of the invention is the provision of an apparatus for transferring a measured quantity of sample from one position to another in which rather small liquid samples are accurately measured and handled automatically.

Still another object of the invention is the provision of an apparatus capable of taking up and delivering a measured quantity of liquid sample together with a measured quantity of another liquid by utilizing a unique combination of pumps and a valve mechanism whereby the taking up and delivery of liquid may be completely and automatically controlled through the valve operation alone.

Further objects and advantages of our invention will be apparent as the specification progresses and the new and useful features of our automatic sample handling apparatus will be fully defined in the claims attached hereto.

Figure 2:
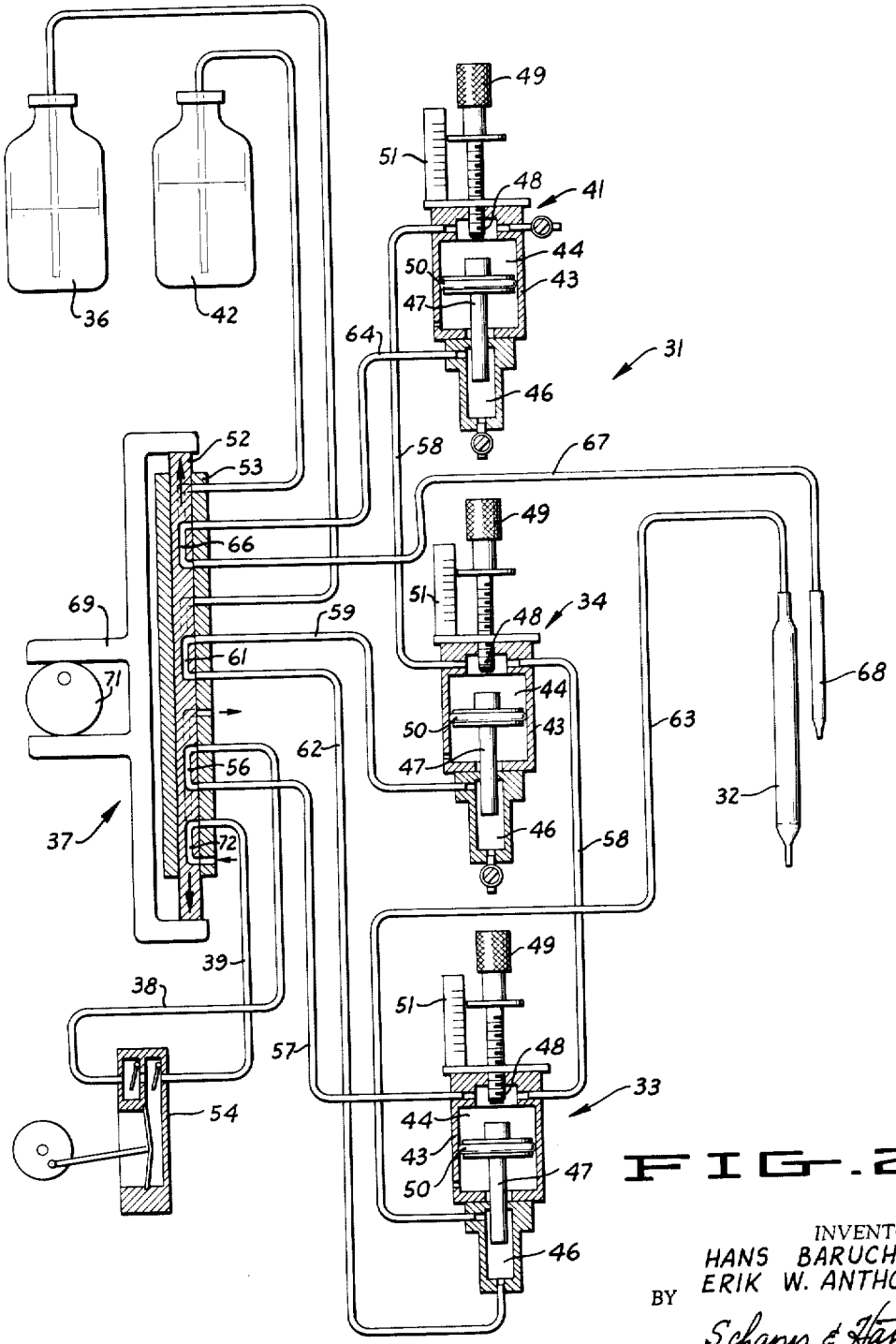

The preferred forms of our invention are illustrated in the accompanying drawing forming part of this description, in which:

FIGURE 1 is a schematic view of an embodiment of the invention illustrating the broad aspect thereof; and FIGURE 2 is a schematic view illustrating in detail a preferred form of the invention.

While we have shown only a broad form and a preferred form of our invention, it should be understood that various changes or modifications may be made within the scope of the claims attached hereto without departing from the spirit of the invention.

In its broad form, the invention combines a probe or pipette capable of taking up a measured quantity of liquid sample or the like, in combination with pump means for controlling liquid in the probe and a liquid supply source for providing diluent, reagent or the like and washing out the probe so as to leave the probe clean for the next operation.

Referring to FIGURE 1 in detail, the broad aspect of the invention is illustrated by the apparatus 11 comprising a suitable source of sample at a sample site 12 wherein sample is carried into a container 13, a probe or pipette 14 positioned at the sample site, a pump 16 for moving fluid in and out of the probe, a liquid supply source 17 and a valve 18 for regulating the fluid flow provided by the pump.

The sample site 12 is here shown as occupied by one of the containers 13, and the containers 13 are carried on a turntable 19 so as to provide movement into and out of operative relation to the probe. Alternatively, other means may be used to move the samples, if desired. As here shown, the probe 14 is also moved in a reciprocating motion along its axis as indicated by arrow 21. In this way, the probe may be moved to operative position at a drain 22 or into position at a delivery site 23. All of these movements may be mechanized together through suitable reciprocating mechanical means (not shown) so that this operation of the device is suitable for automation.

The pump 16 is similar to a hypodermic needle type pump, and it comprises a barrel 24 and a piston 26 sliding therein. Thus when valve 18 is closed, movement of piston 26 causes fluid to be taken into or forced out of the passage within the probe 14, the barrel 24 and a line 27 associated therebetween.

As best seen in FIGURE 1, line 27 has a narrow area 28 which serves to restrict the flow of sample into line 27 so that during operation of the apparatus with valve 18 in communication with liquid supply source 17, the barrel 24 of the pump fills with liquid from the liquid supply source while the probe is filling with sample. The narrow area may also be used as a gauge to provide an accurately determined volume of sample.

Thus in operation of the device of FIGURE 1, the probe 14 is positioned at the sample site and valve 18 is opened while the piston 26 is in the closed or upward position. Then the piston 26 is drawn downward to draw in reagent, diluent or other liquid while the sample moves slowly into the probe and through the narrow area and up into line 27, but the movement is stopped before sample reaches the junction 29 of the pump and line 27. The valve is then turned to the closed position and the probe is moved to the drain. The piston 26 is then moved upwards an amount sufficient to expel the sample into the drain while retaining a measured quantity of reagent. The probe is moved back to the sample tube and a measured quantity of sample is then drawn in by controlled movement of the pump. With the system thus charged with measured quantities of reagent and sample, the probe is moved into operative position at the delivery site and the pump operated to discharge all of the sample and the measured amount of reagent. It is seen that the reagent is last delivered and washes the probe in preparation for the next operation.

Other methods of operation are also possible. For example, the operation could be simplified by beginning the cycle as mentioned above with the valve open, but stopping the operation of the pump when the desired amount of sample is taken up. The valve is closed and the probe moved to the delivery site. The pump is then operated to discharge the sample followed by reagent or diluent. The ratio of reagent to sample is determined by the flow characteristics of the system and the size of the constriction 28. In this operation, the drain 22 is not used.

The operation could also be accomplished by begining with the valve open, and drawing in excess sample. The valve is then closed and the probe moved to the drain. With this position obtained, the piston 26 is moved upwards to expel sufficient sample through the probe so that the interface between the sample and the reagent is in the narrow area. Then the probe is moved into operative position within the delivery site and piston 26 moved upwards to expel all of the sample followed by a desired amount of reagent or diluent that has been drawn into the pump barrel 24.

While the embodiment shown in FIGURE 1 is operative for the purpose required, it is often desired to utilize an apparatus in which the measurement of the sample and of the diluent or other liquid is much more accurately controlled. Such a system is provided in the embodiment shown in FIGURE 2, in which a special valve and a plurality of pumps are used for the purpose. In addition, the embodiment of FIGURE 2 shows how a reagent dispenser may be included in addition to the sample delivery system with the reagent dispensing system operating through the same valve as the sample delivery system, thus being programmed to operate simultaneously therewith.

Thus in the embodiment illustrated in FIGURE 2, there is shown an apparatus 31 capable of transferring a measured quantity of sample from one position to another while simultaneously providing an accurately measured quantity of diluent and an accurately measured quantity of reagent. As here shown, the device comprises a probe or pipette 32, pumps 33 and 34, reagent [for] *or* diluent container 36, and a valve 37 which provides communication between the pumps and either pressure line 38 or vacuum line 39. In addition, the pump 41 may be included in the system for drawing reagent from reagent container 42 and delivering it to the sample either as the sample is added at the delivery site or at any other desired position.

All of the pumps 33, 34 and 41 are similarly constructed and adapted to operate by means of air pressure or vacuum with the air pressure causing the pump to move in one direction and the vacuum causing it to move in reverse direction. Thus each pump comprises a housing 43 enclosing chambers 44 and 46 with chamber 44 adapted to contain air under pressure or vacuum on one side of a piston 50 with the other side vented. Movement of piston 50 activates a plunger 47 which reciprocates in chamber 46 and is sealed through the housing to prevent fluid communication between the chambers. Thus plunger 47 adjusts the volume in chamber 46 and effects movement of liquids into and out of each chamber depending upon the valve positions.

In order to accurately adjust the volume of liquid taken into the chambers 46, stop means 48 are provided to limit the movement of the plungers 47. In order to adjust the stop means 48, knurled handle 49 is rotated so as to move stop means 48 through its sealed threaded engagement with the housing 43. The setting may be accurately adjusted on a suitable gauge 51 which may include a vernier scale (not shown) or any other conventional measuring scale for providing accurate measurements.

The valve 37 may be any valve structure capable of providing the communications shown for the position illustrated in the drawing and the position shown in phantom in the drawing. For example, any two-position, three-way ganged valve structure would be functional. As shown in the schematic representation of valve 37 in FIGURE 2 of the drawings, a suitable combined valve may be constructed in which a ported valve member 52 is slidable from one position to the other in a suitably ported housing 53. A very suitable valve and mechanism for operating the same is described and claimed in the co-pending application Serial No. 183,506 of Erik W. Anthon filed March 29, 1962, *now U.S. Patent No. 3,199,538* entitled Valve and assigned to the assignee of the present application.

In operation, the device has the valve position shown when liquid is being discharged from the probe or pipette 32 into a receiving container. This discharge is effected because air pressure from the air compressor 54 passes into the valve from line 38, through the valve in passage 56, and through line 57 to the chamber 44 of pump 33 which is in communication with the chambers 44 of pumps 34 and 41 through lines 58. With chambers 44 pressurized, the pistons 50 and associated plungers 47 are moved downwardly to cause chambers 46 to be decreased in volume so that liquid is discharged from each chamber. In this way, the sample taken into the probe or pipette is first discharged, and then diluent follows to wash out the sample. More specifically, the diluent is discharged from chamber 46 of pump 34 through line 59, passage 61, line 62, chamber 46 of pump 33 and thence through line 63 and probe 32.

While the diluent in the sample is discharged, reagent is also being discharged from pump 41 by virtue of the fact that air pressure is moving the plunger 47 thereof downward and decreasing the volume of its chamber 46. As chamber 46 of pump 41 is decreased in volume, reagent flows out through line 64, passage 66, line 67 and out through reagent probe 68. The reagent probe may be positioned either at the sample receiving site or at any other station depending upon the desired programming to be used.

After sample, diluent and reagent are delivered as explained above, valve element 52 is positioned in the position shown in phantom, in FIGURE 2 by any suitable means. As here shown, the block is moved by reciprocating member 69 which is operated by an eccentric 71 through a motor which is activated by suitable relays (not shown) in order to bring the valve operation in proper timed relation with any other components that may be added to carry out other analytical process steps.

When the valve is positioned at the opposite extreme the passages 56, 61, 66 and 72 are raised as shown in phantom on the drawing, and the chambers 44 of the pumps 33, 34 and 41 are connected to the suction side of the pump through loop passage 72 in the valve and line 39. With this connection, the plungers 47 are drawn upwardly and the chambers 46 are increased in volume so as to suck in fluid and fill the chambers. Chamber 46 of pump 33 is in communication with the pipette or probe while its other line is cut off. In this way, the amount of liquid taken up into the pipette is exactly the same as the change in volume of chamber 46 as adjusted on the gauge 51 of said pump. In similar fashion, pump 34 is in communication with the reagent or diluent container 36 and the amount of liquid taken into chamber 46 of this pump is again regulated by its gauge.

It is important in the operation of this mechanism that the chambers 46 and associated lines be kept filled with diluent at all times so that the pumps operate accurately through incompressible liquids. Similarly, pump 41 has its chamber 46 and associated lines filled at all times with reagent. Thus the quantity of reagent taken up by the pump on the up or vacuum stroke is measured accurately by its gauge 51. The timing is arranged so that sufficient time is allowed for the liquids to be drawn in the chambers with the plungers moved to the full position possible in contact with the associated stop means 48. In this way, full volumes of liquid are taken up and delivered.

The probe 32 may be moved from the sample site to the delivery site by any suitable mechanism such as the Materials Handling Apparatus described and claimed in the United States Patent application Serial No. 61,206 filed October 7, 1960, *now U.S. Patent No. 3,178,266,* by Erik W. Anthon, an inventor in the present application. Alternatively, the samples may be moved with respect to the probe as shown in FIGURE 1.

Accordingly, it is seen that we have provided an apparatus capable of providing the rather difficult process steps of taking up and delivering measured quantities of sample. In addition, the apparatus is constructed to be self-cleaning to keep the apparatus free of contamination, and is capable of providing exceedingly accurate quantities of the fluids handled.

We claim:

[1. An apparatus for transferring a measured quantity of liquid sample from one position to another, comprising a probe adapted for taking up a liquid sample at a reservoir source, a first pump means connected to said probe and formed for drawing liquid sample into the probe, a reservoir for holding a wash liquid, a second pump means operatively connected to said reservoir and said probe and formed for taking up said wash liquid and delivering the wash liquid through the probe, and means for controlling said first and second pumps and directing delivery of said wash liquid from said second pump through said first pump and said probe whereby the following wash liquid will rinse the liquid sample from said probe.]

2. An apparatus for transferring a measured quantity of liquid sample from one position to another, comprising a probe for taking up liquid sample, a first pump means *having a first chamber* connected to said probe and formed for taking up a measured quantity of liquid sample into the probe, a reservoir for holding diluent to be added to the liquid sample, a second pump means *having a second chamber* operatively connected to said reservoir and said probe and formed for taking up a measured quantity of diluent, and control means for *simultaneously* effecting actuation of said first and second pumps [and] *for taking up said liquid sample and diluent and then* directing delivery of diluent from said second pump *chamber directly* through said first pump *chamber* and said probe whereby the diluent *while effecting the desired dilution* washes liquid sample from the probe and thereby cleans the same.

3. The apparatus defined in claim 2, in which each one of the pump *chambers* [means] is formed with [a chamber and] a plunger movable into and out of the chamber to provide a differential volume in the chamber.

4. The apparatus defined in claim 3, in which each one of the pump means is also provided with an adjustable stop for accurately adjusting the length of stroke of the plunger so as to selectively vary said differential volume in the chamber.

5. The apparatus defined in claim 4, in which an air compressor is provided to actuate the plunger of each of said pump means by operative connection of the compression side and vacuum side of the compressor to the pump means through said control means.

6. An apparatus for transferring a measured quantity of liquid sample from one position to another, comprising a first probe for taking up liquid sample, a first pump means for drawing liquid sample into the first probe, a first reservoir for holding a supply of wash liquid to be added to the liquid sample, a second pump means for taking up wash liquid from said first reservoir and delivering said wash liquid through said first probe, a second probe for delivering reagent to the sample, a second reservoir for holding reagent to be added to the sample, a third pump means for taking in a measured quantity of reagent and delivering said reagent through said second probe, and control means for effecting actuation of said first, second and third pump means and for directing delivery of wash liquid from said second pump through said first pump and said first probe whereby the wash liquid rinses the liquid sample from said first probe.

7. An apparatus for transferring a measured quantity of liquid sample from one position to another, comprising a first probe for taking up liquid sample and delivering said sample and a diluent, a first pump means for taking up a measured quantity of liquid sample into the probe, a first reservoir for holding diluent to be added to the sample, a second pump means for taking up a measured quantity of diluent, a second probe for delivering reagent to the sample, a second reservoir for holding reagent to be added to the sample, a third pump means for taking in a measured quantity of reagent and delivering said reagent through said second probe, and control means for effecting actuation of said first, second and third pump means and directing delivery of diluent from said second pump through said first pump and said first probe whereby the diluent washes liquid sample from the first probe and thereby cleans the same.

8. The apparatus defined in claim 7, in which each one of the pump means is formed with a chamber and a plunger movable into and out of the chamber to provide a differential volume in the chamber [determined by the length of stroke of the plunger in the chamber].

9. The apparatus defined in claim 8, in which each one of the pump means is also provided with an adjustable stop for accurately adjusting the length *of* stroke of the plunger so as to selectively vary said differential volume in the chamber.

10. The apparatus defined in claim 9, in which an air compressor is provided to actuate the plunger of each of said pump means by operative connection of the compression side and vacuum side of the compressor to the pump means through said control means.

11. An apparatus for transferring a measured quantity of liquid sample from a supply site to a sample receiving site, comprising probe means providing a conduit having an end adapted for contacting a body of liquid sample at the supply site for taking a measured quantity of liquid sample into said conduit, reservoir means for containing a supply of other liquid to be expelled through said conduit after said sample, pump means operatively connected to said probe means and reservoir means and formed for taking in a measured quantity of liquid sample, and valve means interposed between said probe means and said reservoir and formed for cooperating with said pump means to expel said measured quantity of liquid sample from said probe means followed by a desired quantity of said other liquid, *said probe means being selectively movable to positions at the sample supply site and the receiving site and at a drain; and said valve means and pump means cooperate to take in an excess quantity of sample when said probe means is at the sample supply site, and cooperate to expel sample from said probe means when the latter is at said drain so as to leave a desired quantity of sample in said probe means, and cooperate to expel said desired measured quantity of sample followed by a desired quantity of said other liquid when said probe means is at said receiving site.*

[12. An apparatus as described in claim 11 and wherein said probe means is selectively movable to positions at the sample supply site and the receiving site and at a drain; and said valve means and pump means cooperate to take in an excess quantity of sample when said probe means is at the sample supply site, and cooperate to expel sample from said probe means when the latter is at said drain so as to leave a desired measured quantity of sample in said probe means, and cooperate to expel said desired measured quantity of sample followed by a desired quantity of said other liquid when said probe means is at said receiving site.]

13. An apparatus as described in claim [12] *11*, and wherein the operative connection of said pump means to said reservoir is formed with a liquid passage having a minimum cross-sectional area, and wherein the conduit in said probe means is formed with a portion having a cross-sectional area considerably smaller than said minimum cross-sectional area of said passage, whereby said pump means will be capable of drawing in liquid sample through said probe and *the* other liquid from said reservoir simultaneously and in a desired ratio determined by the relative minimum cross-sectional areas of said conduit and passage.

[14. An apparatus for separating a measured quantity of sample from a body of liquid sample and adding another liquid thereto, comprising an elongated hollow probe having an end formed with an orifice therethrough communicating with the interior of the probe, a reservoir adapted for containing other liquid, a conduit system adapted for filling with said liquid and formed for operatively connecting said reservoir to the interior of said probe, intake means operative for selectively increasing the effective volumetric capacity of said conduit system for drawing a measured quantity of liquid sample into said probe when said end is dipped into a body of liquid sample, and discharge means connected to said conduit system and formed for effecting pumping of a desired quantity of other liquid from said reservoir into said conduit system after operation of said intake means, whereby said measured quantity of sample and a desired quantity of said other liquid will be expelled from said probe through said orifice.]

*15. The apparatus defined in claim 2, in which an air compressor is provided to actuate said first and second pump means and said control means comprises a combined multi-port air and liquid valve having a power driven linearly reciprocable valve member operable for simultaneously effecting the aforesaid connecting of said compressor to the pump means and providing required liquid communication between said reservoir, pump means and probe.*

*16. The apparatus defined in claim 3, in which said reservoir contains diluent at atmospheric pressure.*

References Cited by the Examiner

The following references, cited by the Examiner, are of record in the patented file of this patent or the original patent.

UNITED STATES PATENTS

| | | | |
|---|---|---|---|
| 2,661,885 | 12/1953 | McBean | 141—105 X |
| 2,807,213 | 9/1957 | Rosen | 103—38 X |
| 3,012,863 | 12/1961 | Feichtmeir | 23—253 |
| 3,127,062 | 3/1964 | Feichtmeir et al. | 222—135 |
| 3,193,148 | 7/1965 | Anthon | 222—334 X |
| 3,197,285 | 7/1965 | Rosen | 141—105 X |

OTHER REFERENCES

Feichtmeir et al.: Journal of Clinical Pathology, Williams and Wilkins Co., U.S.A., 1961, vol. 35, No. 4, RBl A3, pp. 378–382.

LAVERNE D. GEIGER, *Primary Examiner.*

H. BELL, *Assistant Examiner.*